Jan. 20, 1925.　　　　　　　　　　　　　　　　　1,523,752
A. J. CASALE ET AL
AUTOMOBILE BRAKE
Filed July 28, 1921　　　2 Sheets-Sheet 1
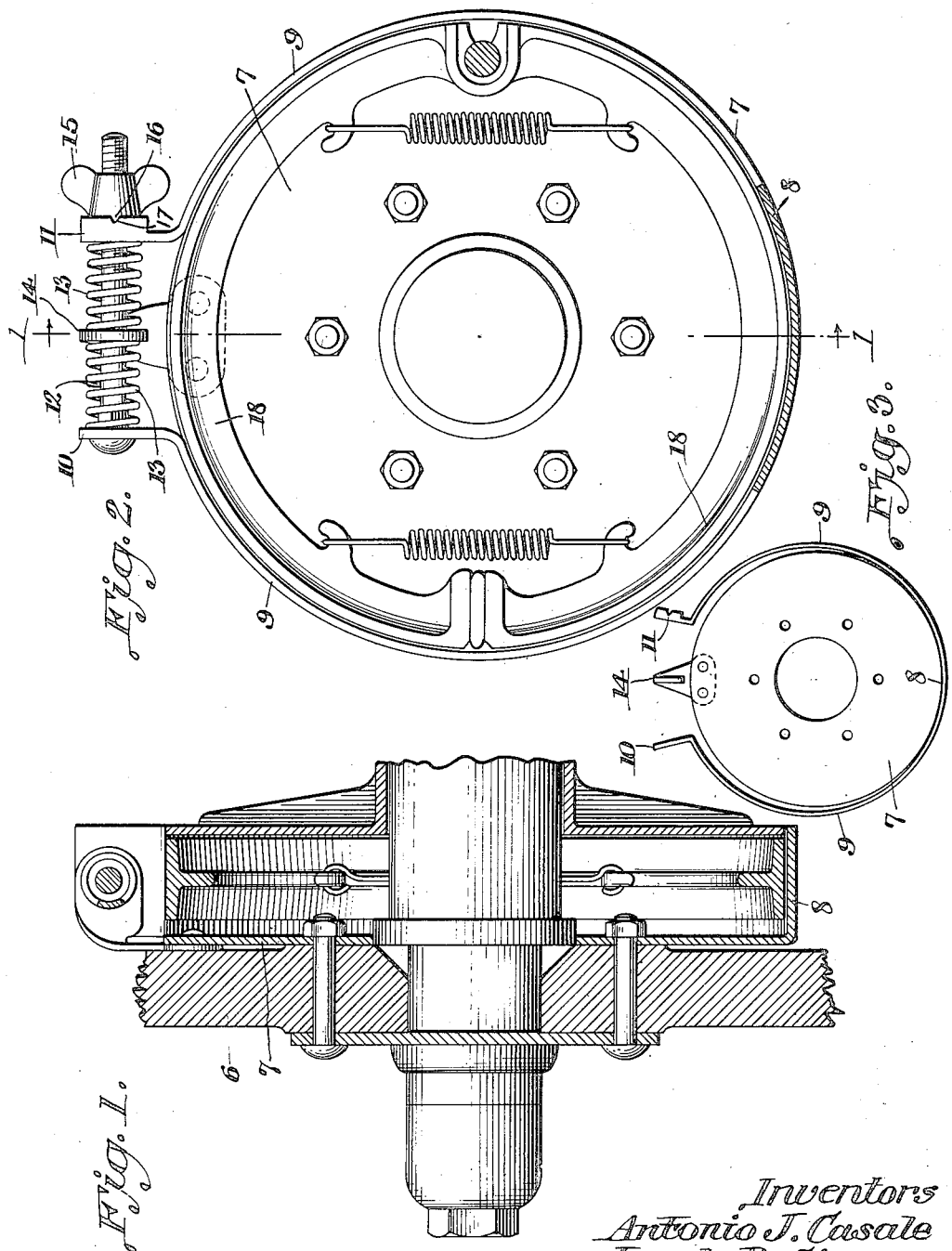
Inventors
Antonio J. Casale
Joseph B. Simpson
By
Attorney Jan. 20, 1925.

A. J. CASALE ET AL

AUTOMOBILE BRAKE

Filed July 28, 1921

Inventors
Antonio J. Casale
Joseph B. Simpson

By Dan Pelts Moore.

Attorney

Patented Jan. 20, 1925.

1,523,752

UNITED STATES PATENT OFFICE.

ANTONIO J. CASALE AND JOSEPH B. SIMPSON, OF TAKOMA PARK, DISTRICT OF COLUMBIA, ASSIGNORS TO NATIONAL DIFFERENTIAL MANUFACTURING COMPANY, A CORPORATION OF DELAWARE.

AUTOMOBILE BRAKE.

Application filed July 28, 1921. Serial No. 488,114.

*To all whom it may concern:*

Be it known that we, ANTONIO J. CASALE and JOSEPH B. SIMPSON, citizens of the United States, residing at Takoma Park, in the District of Columbia and city of Washington, have invented certain new and useful Improvements in Automobile Brakes, of which the following is a specification.

Our invention relates to improvements in automobile brakes, one object of the invention being the provision of a brake drum construction for an internal brake in which certain portion of the brake band receiving rims are so constructed as to be adjustable and thus provide an exceedingly simple, inexpensive and durable arrangement to increase or lengthen the life of the brake drum.

This brake drum is especially designed for use in motor cars and instead of providing a drum with a fixed annular rim, the rim is made with two or more portions thereof resiliently attached to the body of the disk or drum with spring actuated adjusting means for adjusting the size of the drum for cooperation with the internal brake mechanism.

In the accompanying drawings:

Figure 1 is a section taken on line 1—1 of Figure 2.

Figure 2 is an internal plan view of the complete brake drum and internal brake.

Figure 3 is a reduced view with the internal brake removed.

Figure 5:
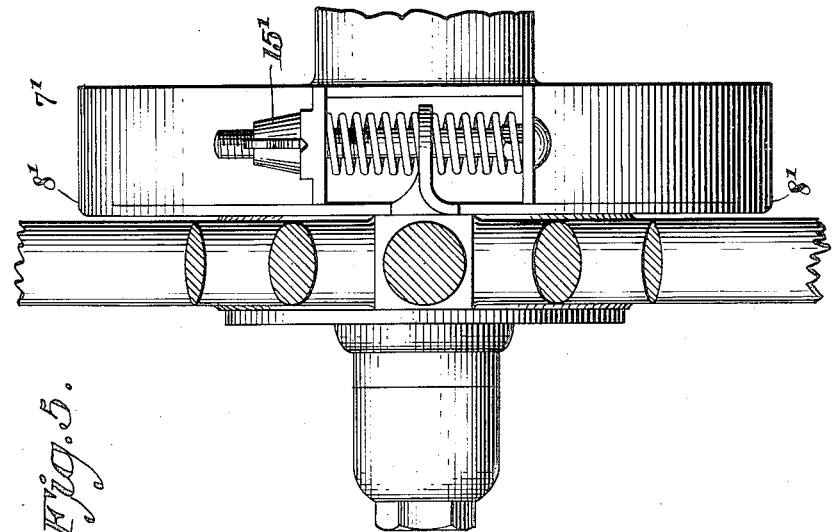
Figure 5 is a view in top plan thereof with a portion of the wheel being shown.

Referring to the drawings, and more particularly to Figures 1, 2 and 3, thereof, the wheel 6 has attached thereto in the usual manner, the drum 7 which in this construction is provided with the rigid portion 8 of the rim whose two oppositely disposed spring band portions 9 are provided with apertured offsets 10 and 11 for the reception of the adjusting bolt 12, the two springs 13 being so disposed between the fixed guiding apertured lug 14 and the two terminals 10 and 11 as to hold the thumb nut 15 in adjusted position with the cooperating projection 16 and the recess 17.

From the foregoing it will be seen that by adjusting the flexible members 9 toward each other, any wear can be taken care of upon the inner surface of the brake drum to compensate for the wear upon the outer surface of the internal brake members 18 which are of the usual construction employed upon motor cars.

Figure 4:
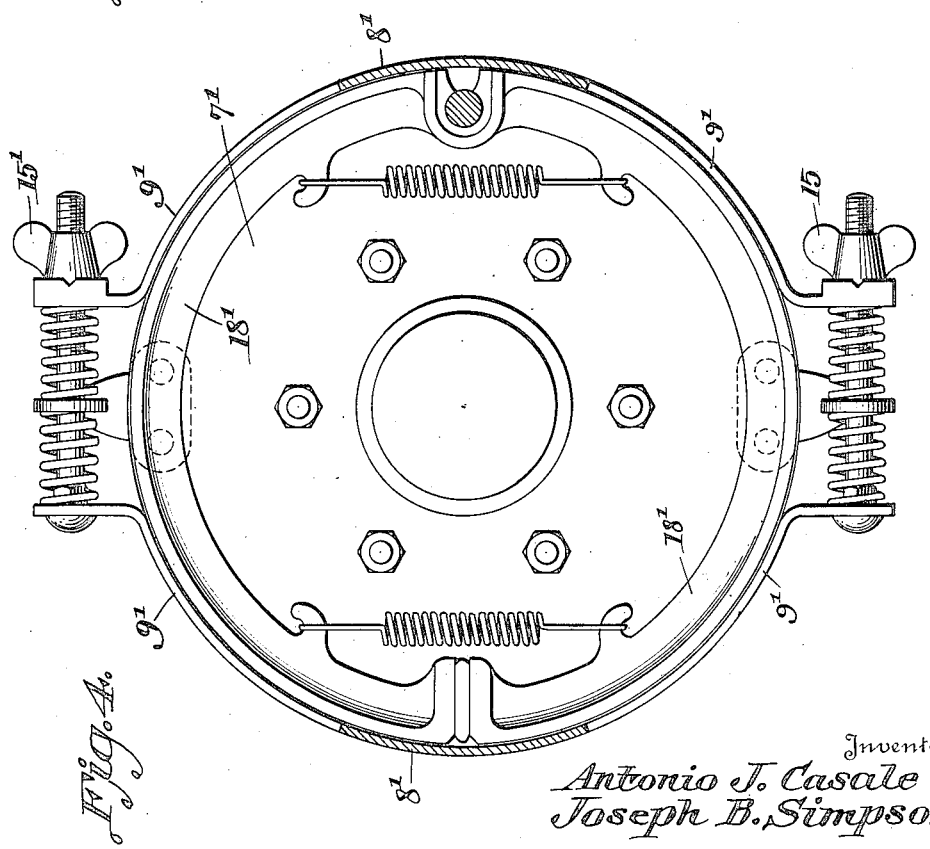
Figure 4 is a view similar to figure 2 of a modified form.

In the construction shown in Figures 4 and 5, the drum 7' is provided with the rigid portions 8' at diametrically opposite points of the rim and with four flexible or spring band partial members 9', which correspond to and are made similar to the members 9 heretofore described, the other parts of the device being exactly the same. In this form, two adjusting points are provided for the band relative to the two internal brake members 18'.

From the foregoing description, it is evident with a construction of this type that the life of the emergency brake is greatly increased and any wear upon the respective braking members can be taken care of readily without removing the internal member but by merely adjusting the various thumb nuts 15 and 15'.

What we claim as new is:

1. A brake drum having its rim provided with an adjustable spring tensioned braking member, a bolt for adjusting the member to increase or decrease the tension thereof, and springs carried by the bolt for imparting a resilient tension at the adjusting point of said braking member.

2. An emergency brake including a disk having a rim attached thereto at one point with two oppositely extending spring tensioned contiguous portions, the ends of which are apertured and off-set, and means for adjusting the ends relative to each other.

3. An emergency brake including a disk having a rim attached thereto at one point with two oppositely extending spring tensioned contiguous portions, the ends of which are apertured and off-set, and spring expanded means for adjusting the ends relative to each other.

In testimony whereof we affix our signatures.

ANTONIO J. CASALE.
JOS. B. SIMPSON.